United States Patent
Magcale et al.

(10) Patent No.: US 10,158,653 B1
(45) Date of Patent: Dec. 18, 2018

(54) ARTIFICIAL INTELLIGENCE WITH CYBER SECURITY

(71) Applicant: Nautilus Data Technologies, Inc., Pleasanton, CA (US)

(72) Inventors: Arnold Magcale, Pleasanton, CA (US); Daniel Kekai, Pleasanton, CA (US)

(73) Assignee: Nautilus Data Technologies, Inc., pleasanton, CA (US)

( * ) Notice: Subject to any disclaimer, the term of this patent is extended or adjusted under 35 U.S.C. 154(b) by 0 days.

(21) Appl. No.: 14/959,608

(22) Filed: Dec. 4, 2015

(51) Int. Cl.
*H04L 29/06* (2006.01)
*G06N 3/063* (2006.01)
*G06N 3/08* (2006.01)

(52) U.S. Cl.
CPC ......... *H04L 63/1416* (2013.01); *G06N 3/063* (2013.01); *G06N 3/08* (2013.01); *H04L 63/1425* (2013.01); *H04L 63/1441* (2013.01)

(58) Field of Classification Search
CPC . H04L 63/14; H04L 63/1408; H04L 63/1416; H04L 63/1425; H04L 63/1433; H04L 63/1441; G06F 21/57; G06F 21/577; G06F 2221/033; G06N 3/063; G06N 3/08
See application file for complete search history.

(56) References Cited

U.S. PATENT DOCUMENTS

| | | | |
|---|---|---|---|
| 6,212,895 B1 | 4/2001 | Richardson | |
| 6,990,395 B2 | 1/2006 | Ransom et al. | |
| 7,058,710 B2 | 6/2006 | McCall et al. | |
| 7,278,273 B1 | 10/2007 | Whitted et al. | |
| 7,525,207 B2 | 4/2009 | Clidaras et al. | |
| 7,738,251 B2 | 6/2010 | Clidaras et al. | |
| 8,359,191 B2 | 1/2013 | Chen et al. | |
| 8,853,872 B2 | 10/2014 | Clidaras et al. | |
| 2002/0010709 A1 | 1/2002 | Culbert et al. | |
| 2006/0259201 A1 | 11/2006 | Brown | |
| 2007/0213000 A1 | 9/2007 | Day | |
| 2007/0281639 A1 | 12/2007 | Clidaras et al. | |
| 2008/0209234 A1 | 8/2008 | Clidaras et al. | |
| 2009/0037268 A1 | 2/2009 | Zaid et al. | |
| 2009/0083126 A1 | 3/2009 | Koren et al. | |
| 2009/0084297 A1 | 4/2009 | Choi et al. | |
| 2009/0126910 A1 | 5/2009 | Campbell et al. | |

(Continued)

FOREIGN PATENT DOCUMENTS

| JP | 2010269641 | 12/2010 |
|---|---|---|
| WO | 2000048288 | 8/2000 |

(Continued)

OTHER PUBLICATIONS http://www.nolimitssoftware.com/wp-content/uploads/2013/03/DCIM-Guide.pdf.

*Primary Examiner* — Ayoub Alata
(74) *Attorney, Agent, or Firm* — Unisha Patel

(57) ABSTRACT

A cyber security system that uses artificial intelligence, such neural networks, to monitor the security of a computer network and take automated remedial action based on the monitoring. The security system autonomically learns behavior profiles, attack profiles and circumvention techniques used to target the network. The remedial action taken by the system includes isolating any misuse that has been identified, surveilling the misuse in the isolated environment, analyzing its behavior profile and reconfiguring the network to enhance security.

10 Claims, 3 Drawing Sheets

(56) References Cited

U.S. PATENT DOCUMENTS

| | | |
|---|---|---|
| 2009/0207567 A1 | 8/2009 | Campbell et al. |
| 2009/0295167 A1 | 12/2009 | Clidaras et al. |
| 2009/0299824 A1 | 12/2009 | Barnes |
| 2010/0030552 A1 | 2/2010 | Chen et al. |
| 2010/0298997 A1 | 11/2010 | Ohba et al. |
| 2011/0060470 A1 | 3/2011 | Campbell et al. |
| 2011/0072293 A1 | 3/2011 | Mazzaferri et al. |
| 2011/0207391 A1 | 8/2011 | Hamburgen et al. |
| 2012/0042263 A1 | 2/2012 | Rapaport et al. |
| 2012/0136998 A1 | 5/2012 | Hough et al. |
| 2012/0166433 A1 | 6/2012 | Tseng |
| 2012/0166616 A1 | 6/2012 | Meehan et al. |
| 2013/0238795 A1 | 9/2013 | Geffin et al. |
| 2014/0165060 A1* | 6/2014 | Muller .................. G06F 9/5022 718/1 |
| 2014/0259618 A1 | 9/2014 | Rikoski et al. |
| 2016/0044054 A1* | 2/2016 | Stiansen ............. H04L 63/1416 726/24 |

FOREIGN PATENT DOCUMENTS

| | | |
|---|---|---|
| WO | 2009055368 | 4/2009 |
| WO | 2010129341 | 11/2010 |
| WO | 2012047746 | 4/2012 |
| WO | 2013113138 | 8/2013 |

\* cited by examiner

ARTIFICIAL INTELLIGENCE WITH CYBER SECURITY

CROSS REFERENCE TO RELATED APPLICATIONS

NA

BACKGROUND

This invention relates to cyber-security monitoring and more particularly automated and learned responses to such monitoring. The rapid growth of data usage also brings about the rapid growth of vulnerability with regard to the physical and virtual security of the data centers required to store and process this data. Conventional data center security systems lack the agility to detect and respond to these threats in a truly proactive manner. The system and method described herein for securing data within a data center or elsewhere includes holistically collecting data, assessing/analyzing risk and automatically providing a remedial response to that risk based on learned behaviors, attack profiles and circumvention techniques.

SUMMARY

The following presents a simplified summary relating to one or more aspects and/or embodiments disclosed herein. As such, the following summary should not be considered an extensive overview relating to all contemplated aspects and/or embodiments.

Embodiments disclosed include a method for holistically collecting security information data over the network, from a plurality of appliances and application layers. In the disclosed method, the collecting also includes assessing and analyzing a risk component of the collected security information. The collecting also includes providing an appropriate automated response to the assessed and analyzed security risk component via a remediation implementation layer.

Other embodiments of this aspect include corresponding computer systems, apparatus, and computer programs recorded on one or more computer storage devices, each configured to perform the actions of the methods.

An embodiment includes, in a computer automated system capable of communicating over a network, a method for detecting security threats over the network, and for taking remedial action based on the detected threats, the method including: holistically collecting security information data over the network, from a plurality of appliances and applications. Based on the collected security information data, the computer system is configured for assessing a risk level and identifying based on pre-determined criteria, zero or more security risks from the collected data. The system is further configured for analyzing and identifying a risk profile of an appliance or application based on the assessed risk level and the zero or more identified security risks, and for automatically isolating any misuse that has been identified with the identified security risk profiles. Further, this triggers automatically implementing surveillance of the misuse in the isolated environment, and analyzing the security and behavior profile of data collected from the surveillance of the isolated misuse. In the disclosed method, the systems are configured for autonomically learning the behavior profile of the identified appliance or application, and for assessing the security risks based on the learned behavior profile; and autonomically learning of attack profiles and circumvention techniques used to target the network, appliances and applications. Other embodiments of this aspect include corresponding computer systems, apparatus, and computer programs recorded on one or more computer storage devices, each configured to perform the actions of the methods.

Embodiments disclosed include a computer automated system capable of communicating over a network, configured to detect security threats over the network, and to take remedial action on detected threats, where the system is caused to holistically collect security information data over the network, from a plurality of appliances and application layers. The system is further caused to assess and analyze a risk component of the collected security information. And in a remediation implementation layer, the system is configured to provide appropriate automated responses to the assessed and analyzed security risk component. Other embodiments of this aspect include corresponding computer systems, apparatus, and computer programs recorded on one or more computer storage devices, each configured to perform the actions of the methods.

Embodiments disclosed include a computer automated system capable of communicating over a network, configured to detect security threats over the network, and to take remedial action based on the detected threats, wherein the system is caused to holistically collect security information data over the network, from a plurality of appliances and applications. Based on the collected security information data, the system is further caused to assess a risk level and identify based on pre-determined criteria, zero or more security risks from the collected data. The assessment triggers an analysis and identification of a risk profile of an appliance or application based on the assessed risk level and the zero or more identified security risks. Identified risks trigger an automatic isolation of any misuse that has been identified with the identified security risk profiles and automatic implementation of surveillance in the isolated environment. Data collected from the surveillance of the isolated misuse is analyzed and the result of the analysis triggers autonomic learning of the behavior profile of the identified appliance or application. This triggers an assessment of the security risks based on the learned behavior profile. Preferably the system is configured to autonomically learn of attack profiles and circumvention techniques used to target the network, appliances and applications. Other embodiments of this aspect include corresponding computer systems, apparatus, and computer programs recorded on one or more computer storage devices, each configured to perform the actions of the methods.

DETAILED DESCRIPTION

Figure 1:
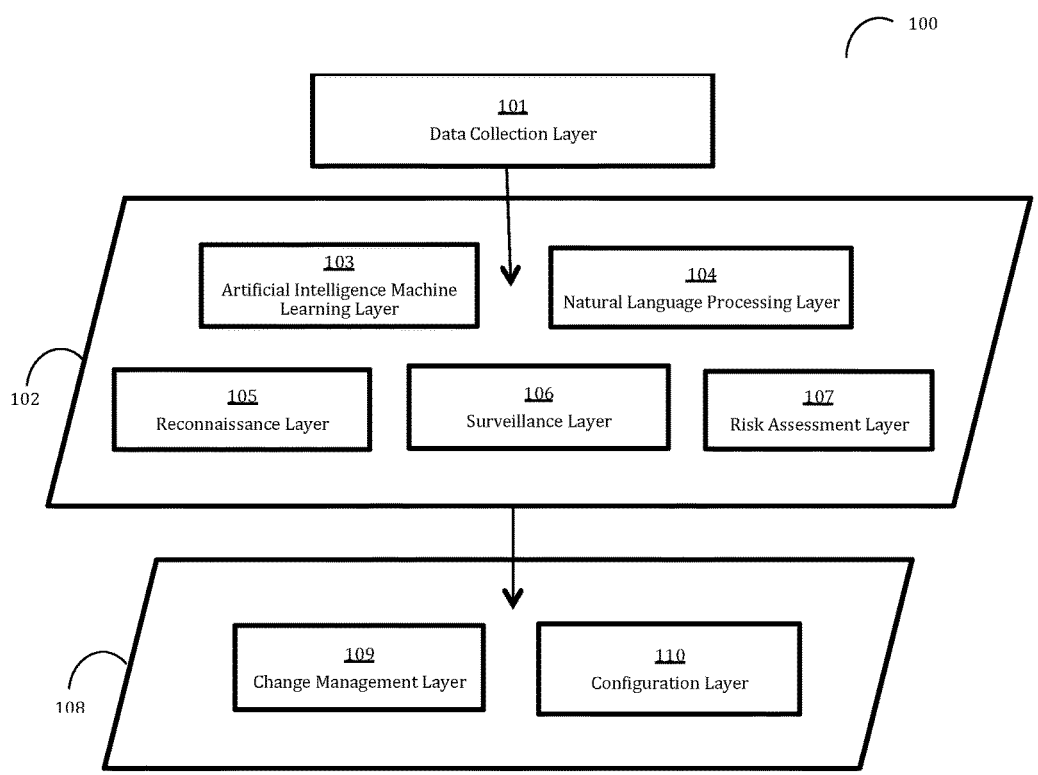
FIG. 1 depicts a system for detecting security threats over a network and taking remedial action based on those detected security threats.
Figure 2:
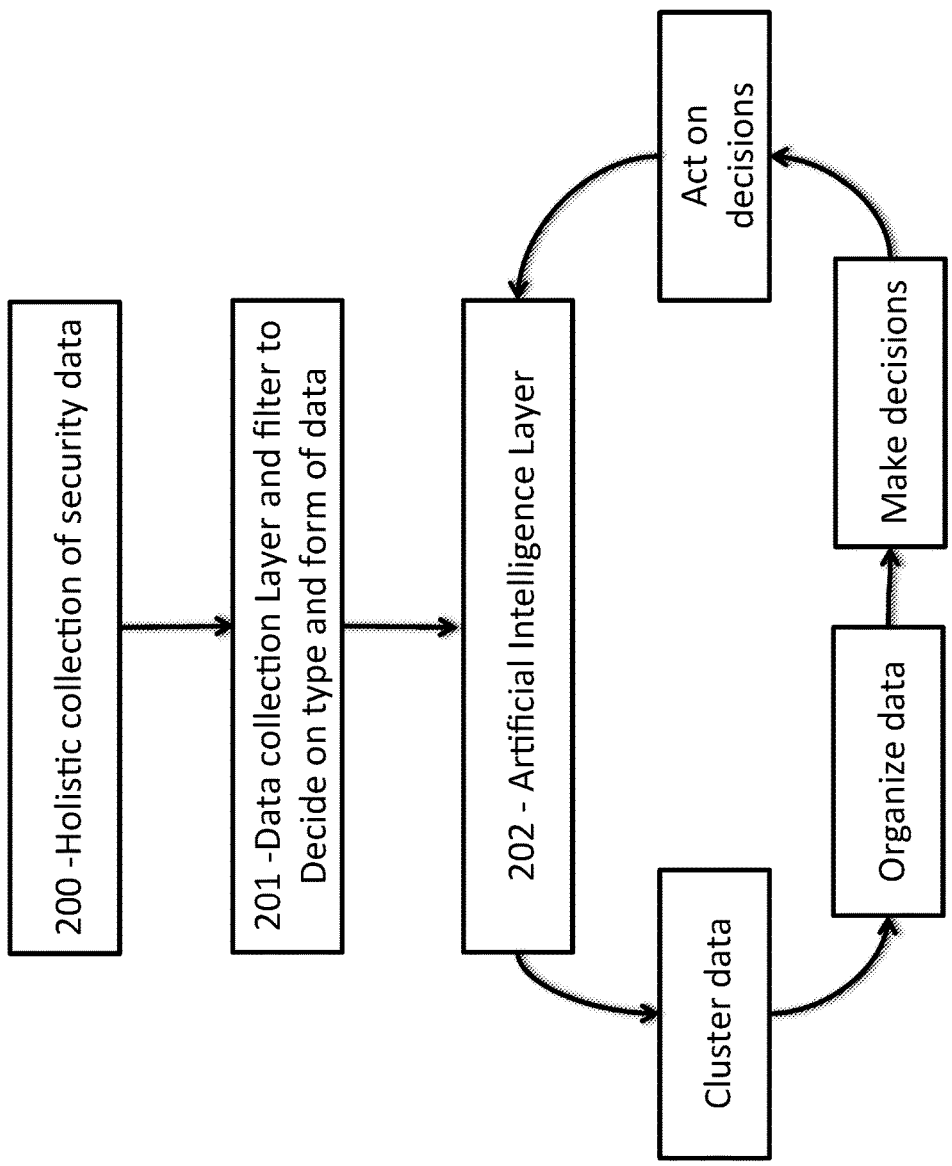
FIG. 2 depicts the flow of data through a holistic data collection devise, which takes all of the data from every aspect of the security system, performs a rudimentary analysis of the system through a clustering program 200. Then, the data is collected and organized into different types and forms of the data based on how it is clustered into various forms 201. This could be based on levels of importance, type of form of data. The next level is the artificial intelligence level, which refers to a computation engine, which uses analytics tools to organize data, make decisions about threats and non-threats, and ultimately acts on the data 202.
Figure 3:
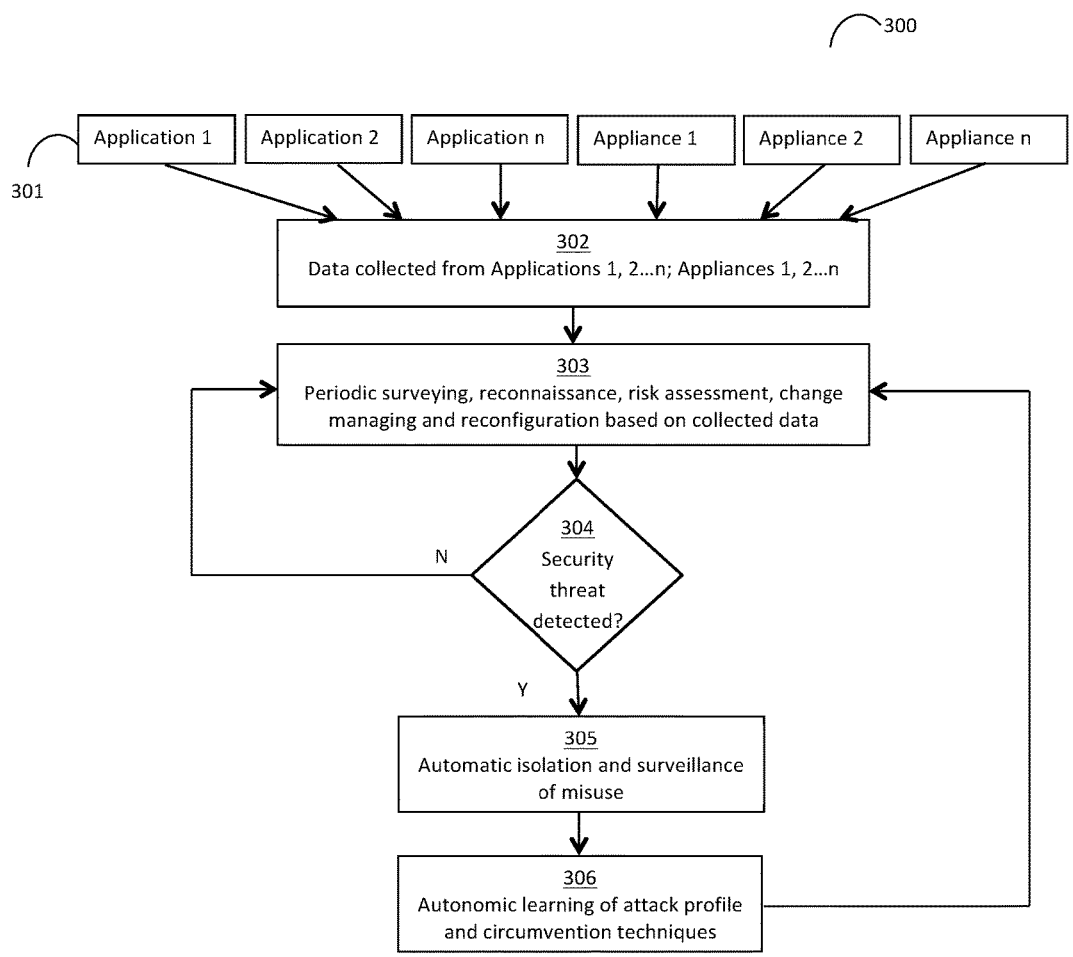
FIG. 3 depicts the flow of data through the system 300. Data is collected from a plurality of appliances and applications 301 in a data collection layer 302. The data is then assessed and analyzed in an assessment and analysis layer 303. The assessment and analysis comprises cognitive cyber security analytics in an artificial neural network to autonomically learn threat patterns, vulnerabilities, anomalous behavior, malicious attacks or misuse of the network or application asset. The assessment and analysis further comprises natural language processing, periodic surveying, periodic reconnaissance, periodic risk assessment, periodic change managing and periodic reconfiguration. If the security risk profile detects a security risk 304, the misuse is automatically isolated and then surveilled in the isolated environment 305. In addition, based on the surveillance and behavior profile data, the system autonomically learns the attack profiles and circumvention techniques used to target the network, appliances and applications 306. Autonomic learning of the behavior profile of the identified appliance or application enables future preemptive corrective action.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Embodiments disclosed include a computer implemented method for detecting security threats over a network, and for performing cyber-security defense by taking remedial action on detected threats. The method comprises holistically collecting security information data over the network, from a plurality of appliances and application layers. The method further includes assessing and analyzing a risk component of the collected security information, and accordingly providing an appropriate automated response to the assessed and analyzed security risk component via a remediation implementation layer.

According to an embodiment, the computer implemented method further comprises at least one of evaluating, simulating and recognizing a usage pattern that puts a computer at risk. Additionally, the assessing and analyzing further comprises cognitive cyber-security analytics in an artificial neural network implemented method that comprises autonomic machine learning for recognition of threat patterns, vulnerabilities, anomalous behavior, malicious attack or misuse of network or application assets.

According to an embodiment of the computer implemented method, a data collection layer is configured for data collection; and an artificial intelligence machine learning layer is configured to assess and analyze the collected data, and based on the collected data, assessment and analysis, implement an artificial intelligence machine learning. According to a preferred embodiment, the assessment and analysis further comprises natural language processing in a natural language processing layer, a periodic surveying in a surveillance layer, a periodic reconnaissance in a reconnaissance layer, a periodic risk assessment in a risk assessment layer, a periodic change managing in a change management layer, and a periodic reconfiguration in a configuration layer.

Embodiments disclosed include computer implemented methods for detection of security threats over a network, and methods for taking remedial action based on the detected threats. The method comprises holistically collecting security information data over the network, from a plurality of appliances and applications. Based on the collected security information data, the method comprises assessing a risk level and identifying based on pre-determined criteria, zero or more security risks from the collected data. Further, the method includes analyzing and identifying a risk profile of an appliance or application based on the assessed risk level and the zero or more identified security risks. According to a preferred embodiment, the method comprises automatically isolating any misuse that has been identified with the identified security risk profiles and automatically implementing surveillance of the misuse in the isolated environment, and analyzing the security and behavior profile data collected from the surveillance of the isolated misuse. Preferably, in the method, autonomously learning the behavior profile of the identified appliance or application enables future preemptive corrective action. Additionally the method comprises assessing the security risks based on the learned behavior profile, and autonomously learning of attack profiles and circumvention techniques used to target the network, appliances and applications.

According to an embodiment, the method comprises at least one of evaluating, simulating and recognizing a usage pattern that puts a computer at risk. The assessing and analyzing further comprises cognitive cyber-security analytics in an artificial neural network implemented method that comprises autonomic machine learning for recognition of threat patterns, vulnerabilities, anomalous behavior, malicious attack or misuse of network or application assets.

According to an embodiment, a data collection layer is configured for data collection. Further, an artificial intelligence machine learning layer is configured for artificial intelligence based machine learning, based on an analysis and assessment of the collected data. Preferably, the assessment and analysis both comprise natural language processing in a natural language processing layer, a periodic surveying in a surveillance layer, a periodic reconnaissance in a reconnaissance layer, a periodic risk assessment in a risk assessment layer, a periodic change managing in a change management layer, and a periodic reconfiguration in a configuration layer.

Embodiments disclosed include a computer automated system accessible over a network, configured to detect security threats over the network, and to take remedial action on detected threats. The system comprises a processor; a non-transitory storage medium coupled to the processor, and encoded instructions stored in the non-transitory storage medium. The encoded instructions when executed by the processor, cause the computer system to holistically collect security information data over the network, from a plurality of appliances and application layers. Further the system is caused to assess and analyze a risk component of the collected security information, and in a remediation implementation layer, provide appropriate automated responses to the assessed and analyzed security risk component.

According to an embodiment, the system is caused to evaluate, simulate or/and recognize a usage pattern that puts a computer at risk. Further, the system comprises in the assessing and analyzing the risk component, a cognitive cyber-security analytics in an artificial neural network implementation that comprises autonomic machine learning for recognition of threat patterns, vulnerabilities, anomalous behavior, malicious attack or misuse of network or application assets.

According to an embodiment, the system comprises a data collection layer, configured for holistic data collection. Preferably, the system further comprises an artificial intelligence machine learning layer, configured to, based on the assessment and analysis of the collected data, is configured to learn, based on the collected data, learn to pre-empt remedial action. The assessment and analysis both comprise natural language processing in a natural language processing layer, a periodic surveying in a surveillance layer, a periodic reconnaissance in a reconnaissance layer, a periodic risk assessment in a risk assessment layer, a periodic change managing in a change management layer, and a periodic reconfiguration in a configuration layer.

Embodiments disclosed include a computer automated system capable of communicating over a network, configured to detect security threats over the network, and to take remedial action based on the detected threats. The system is caused or configured to holistically collect security information data over the network, from a plurality of appliances and applications. The system is further caused to, based on the collected security information data, assess a risk level and identify based on pre-determined criteria, zero or more security risks from the collected data. Additionally, the system is configured to analyze and identify a risk profile of an appliance or application based on the assessed risk level and the zero or more identified security risks. According to a preferred embodiment, the system is configured to automatically isolate any misuse that has been identified with the identified security risk profiles and automatically implement surveillance of the misuse in the isolated environment. Further, the behavior and security profile of data collected from the surveillance of the isolated misuse is analyzed. Preferred embodiments include configurations that enable autonomically learning the behavior profile of the identified appliance or application, and accordingly assessing the security risks based on the learned behavior profile. In some embodiments the system is configured to autonomically learn of attack profiles, and implement circumvention techniques used to target the network, appliances and applications.

The computer system is further caused to evaluate, simulate or/and recognize a usage pattern that puts a computer at risk. According to an embodiment the system is further caused to in the assessing and analyzing the risk component, analyze via a cognitive cyber-security analytics in an artificial neural network implementation that comprises autonomic machine learning for recognition of threat patterns, vulnerabilities, anomalous behavior, malicious attacks or misuse of network or application assets. The computer system further comprises a data collection layer that configures the system for holistic data collection. Additionally, an artificial intelligence machine learning layer, configures the system to dynamically learn, based on assessment and analysis of the collected data. Preferably, the assessment and analysis both comprise natural language processing in a natural language processing layer, a periodic surveying in a surveillance layer, a periodic reconnaissance in a reconnaissance layer, a periodic risk assessment in a risk assessment layer, a periodic change managing in a change management layer, a periodic reconfiguration in a configuration layer.

FIG. 1 depicts a system 100 for detecting security threats over a network and taking remedial action based on those detected security threats. The data collection layer 101 holistically collects data from a plurality of appliances and appliance layers. Collected data includes, but is not limited to, encrypted data, metadata, and data packets.

The assessment and analytical layer 102 assesses and analyzes risk based on pre-determined criteria and the collected data 101. This layer 102 is comprised of an artificial intelligence machine learning layer 103, natural language processing layer 104, reconnaissance layer 105, surveillance layer 106 and risk assessment layer 107. The assessment and analytical layer 102 further comprises cognitive cyber-security analytics in an artificial neural network. The automatic machine learning layer 103 recognizes threat patterns, vulnerabilities, anomalous behavior, and the malicious attack or misuse of network or application assets.

The remediation implementation layer 108 provides an appropriate automated response to the assessed and analyzed security risk component. This includes, but is not limited to, automatically isolating any misuse that has been identified with the identified security risk profiles and automatically implementing surveillance of the misuse in the isolated environment. The remediation implementation layer 108 is comprised of a change management layer 109 and a configuration layer 110.

Aspects of the present disclosure can be practiced with a variety of computer-system and computer-network configurations, including hand-held devices, multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network to a computer facility. Aspects of the present disclosure can therefore, be implemented in connection with various hardware, software or combinations thereof, in a computer system or other processing system.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it can be implemented by an application specific integrated circuit (ASIC), a programmable logic device (PLD), a field programmable logic device (FPLD), discrete logic, etc.).

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A computer implemented method for detecting security threats over a network, and for performing cyber-security defense by taking remedial action on detected threats, comprising:

collecting security information data over the network, from a plurality of appliances and application layers;

based on the collected security information data, assessing a risk component of the collected security information and identifying based on pre-determined criteria, one or more security risks from the collected data by performing cognitive cyber-security analytics in an artificial neural network implemented method; and based on the assessed risk component and the identified one or more security risks, triggering a remedial action;

wherein the assessing is based on a pre-configured library, a periodic surveying, a periodic change managing, and a periodic reconfiguration;

autonomically learning a behavior profile of the plurality of appliances or application layers; and based on the learned behavior profile, autonomically learning of attack profiles and circumvention techniques used to target the network, the appliances and the application layers.

2. The computer implemented method of claim 1 further comprising in identifying based on pre-determined criteria, one or more security risks from the collected data, at least one of evaluating, simulating and recognizing a usage pattern.

3. The computer implemented method of claim 1 wherein, in identifying based on pre-determined criteria, one or more security risks from the collected data the cognitive cyber-security analytics in the artificial neural network implemented method further comprises autonomic machine learning for recognition of threat patterns, vulnerabilities, anomalous behavior, malicious attack or misuse of network or application assets.

4. The computer implemented method of claim 1 further comprising:

data collection via a data collection layer;

artificial intelligence machine learning based on the collected data and assessment, via an artificial intelligence machine learning layer; and wherein the assessment further comprises natural language processing, a periodic reconnaissance, and a periodic risk assessment.

5. The computer implemented method of claim 1 further comprising:

analyzing and identifying a risk profile of an appliance or application based on the assessed risk level and the one or more identified security risks;

automatically isolating any misuse that has been identified with the identified security risk profiles and automatically implementing surveillance of the misuse in the isolated environment; and analyzing the security and behavior profile data collected from the surveillance of the isolated misuse.

6. A computer automated system comprising a non-transitory machine readable medium having encoded instructions and coupled to a hardware processor, wherein the encoded instructions when executed by the hardware processor, cause the computer automated system to:

collect by the hardware processor, security information data over a network, from a plurality of appliances and application layers and store the collected security information data in the non-transitory machine readable medium;

based on the collected security information data, assess a risk component of the collected security information and identify based on pre-determined criteria, one or more security risks from the collected data via a cognitive cyber-security analytics in an artificial neural network implementation; and based on the assessed risk component and the identified one or more security risks, trigger a remedial action;

wherein the assessing is based on a pre-configured library, a periodic surveying, a periodic change managing, and a periodic reconfiguration;

autonomically learn a behavior profile of the plurality of appliances or application layers; and based on the learned behavior profile, autonomically learn of attack profiles and circumvention techniques used to target the network, the appliances and the application layers.

7. The system of claim 6 wherein the system is further caused to:

in identifying based on pre-determined criteria, one or more security risks from the collected data, at least one of evaluate, simulate and recognize a usage pattern.

8. The system of claim 6 wherein the cognitive cyber-security analytics in the artificial neural network implementation further comprises autonomic machine learning for recognition of threat patterns, vulnerabilities, anomalous behavior, malicious attack or misuse of network or application assets.

9. The system of claim 6 wherein the system is further caused to:

collect the data via a data collection layer;

learn, based on the collected data and assessment, via an artificial intelligence machine learning layer; and wherein the assessment further comprises natural language processing in a natural language processing layer, a periodic reconnaissance, and a periodic risk assessment.

10. The computer automated system of claim 6, wherein the computer automated system is further caused to:

analyze and identify a risk profile of an appliance or application based on the assessed risk level and the one or more identified security risks;

automatically isolate any misuse that has been identified with the identified security risk profiles and automatically implement surveillance of the misuse in the isolated environment; and analyze the security and behavior profile data collected from the surveillance of the isolated misuse.

* * * * *